(12) United States Patent
Okado

(10) Patent No.: US 11,565,193 B2
(45) Date of Patent: Jan. 31, 2023

(54) COMPONENT EXTRACTION APPARATUS

(71) Applicant: SHIMADZU CORPORATION, Kyoto (JP)

(72) Inventor: Takao Okado, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 654 days.

(21) Appl. No.: 16/604,231

(22) PCT Filed: Dec. 27, 2017

(86) PCT No.: PCT/JP2017/047039
§ 371 (c)(1),
(2) Date: Oct. 10, 2019

(87) PCT Pub. No.: WO2018/189966
PCT Pub. Date: Oct. 18, 2018

(65) Prior Publication Data
US 2020/0147515 A1 May 14, 2020

(30) Foreign Application Priority Data

Apr. 11, 2017 (JP) .............................. JP2017-078503

(51) Int. Cl.
| | | |
|---|---|---|
| B01D 11/00 | (2006.01) | |
| B01D 11/02 | (2006.01) | |
| G01K 1/14 | (2021.01) | |
| G01K 13/00 | (2021.01) | |
| G01N 1/44 | (2006.01) | |
| B01L 9/00 | (2006.01) | |
| B01D 11/04 | (2006.01) | |
| G01N 30/02 | (2006.01) | |
| G01N 35/10 | (2006.01) | |

(52) U.S. Cl.
CPC ...... *B01D 11/0203* (2013.01); *B01D 11/0207* (2013.01); *B01D 11/0219* (2013.01);
(Continued)

(58) Field of Classification Search
CPC ............ B01D 11/0203; B01D 11/0207; B01D 11/0219; B01D 11/0484; B01D 11/028;
(Continued)

(56) References Cited

U.S. PATENT DOCUMENTS

2019/0277737 A1* 9/2019 Arts ...................... G01N 31/12

FOREIGN PATENT DOCUMENTS

| CN | 104162416 A | * 11/2014 |
|---|---|---|
| CN | 109580805 A | * 4/2019 |

(Continued)

OTHER PUBLICATIONS

Communication dated Mar. 19, 2021 in Chinese Application No. 201780091841.X, English Translation.
(Continued)

*Primary Examiner* — Gail Kaplan Verbitsky
(74) *Attorney, Agent, or Firm* — Sughrue Mion, PLLC

(57) ABSTRACT

A component extraction apparatus includes a rack placement part, a heater, an extraction medium supply part, a needle assembly, and a temperature sensor. When the container rack is mounted on the rack placement part, a heater is configured to heat the sample containers in direct or indirect contact with sample containers held by the container rack. The needle assembly holds a needle with a tip thereof pointing downward, and the needle being configured to connect a flow channel by inserting the tip thereof into a needle port provided on an upper surface of each of the sample containers. The temperature sensor is included in the needle assembly and is configured to detect a temperature of the upper surface of any one of the sample containers when the tip of the needle is inserted into the needle port of the one of the sample containers.

7 Claims, 8 Drawing Sheets

(52) U.S. Cl.
CPC ............ *B01D 11/0484* (2013.01); *B01L 9/00* (2013.01); *G01K 1/14* (2013.01); *G01K 1/146* (2013.01); *G01K 13/00* (2013.01); *G01N 1/44* (2013.01); *G01N 30/02* (2013.01); *G01N 35/1009* (2013.01); *B01D 11/028* (2013.01)

(58) Field of Classification Search
CPC . B01L 9/00; G01K 1/14; G01K 1/146; G01K 13/00; G01N 1/44; G01N 30/02; G01N 35/1009
USPC .............................. 422/527; 374/10–11, 45
See application file for complete search history.

(56) References Cited

FOREIGN PATENT DOCUMENTS

| | | | | |
|---|---|---|---|---|
| JP | 2008-190916 A | 8/2008 | | |
| JP | 2010-091310 A | 4/2010 | | |
| JP | 2014-160055 A | 9/2014 | | |
| JP | 2016-114574 A | 6/2016 | | |
| JP | 2016114574 A | * 6/2016 | | |
| JP | 6341081 B2 | * 6/2018 | | |
| JP | 2019002693 A | * 1/2019 | | |
| WO | WO201609662 A1 | * 6/2016 | | |
| WO | 2017/017765 A1 | 2/2017 | | |
| WO | WO-2017017765 A1 | * 2/2017 | ............. | G01N 30/00 |
| WO | WO-2017149620 A1 | * 9/2017 | | |
| WO | WO-2018189966 A1 | * 10/2018 | ......... | B01D 11/0203 |
| WO | WO-2018220682 A1 | * 12/2018 | ............. | B01D 11/00 |

OTHER PUBLICATIONS

Notice of Reasons for Refusal dated Nov. 10, 2020 from the Japanese Patent Office in JP application No. 2019-512353.
International Search Report for PCT/JP2017/047039 dated Mar. 13, 2018 [PCT/ISA/210].

* cited by examiner

COMPONENT EXTRACTION APPARATUS

CROSS REFERENCE TO RELATED APPLICATIONS

This application is a National Stage of International Application No. PCT/JP2017/047039 filed Dec. 27, 2017, claiming priority based on Japanese Patent Application No. 2017-078503 filed Apr. 11, 2017.

TECHNICAL FIELD

The present invention relates to a component extraction apparatus configured to extract a target component from a sample using a supercritical fluid.

BACKGROUND ART

It is known that supercritical fluids exhibit excellent dissolving power for many substances. A component extraction apparatus that extracts a component contained in a sample utilizing such properties of a supercritical fluid is proposed (see Patent Document 1).

The supercritical fluid apparatus disclosed in Patent Document 1 includes a placement stand for placing a container rack that holds a plurality of sample containers, and is configured to connect flow channels utilizing a needle with respect to a freely-selected sample container from among the sample containers held by the container rack placed on the placement stand. Each of the upper and lower surfaces of the sample containers has a needle port that is a hole in which the tip of the needle is inserted, and is connected with a flow channel via the needle, thereby allowing a mobile phase containing carbon dioxide to be supplied from the lower surface and sample components to be extracted from the upper surface of the sample container.

A back pressure regulating valve configured to regulate the pressure in the flow channel for the mobile phase to a predetermined pressure is provided with the flow channel connected to the upper surface side of the sample containers, and a temperature controller configured to control the temperature of the lower surface side of the sample container to a predetermined temperature is provided. The back pressure regulating valve and the temperature controller control a pressure and temperature of the mobile phase to be supplied to the sample containers so that the mobile phase becomes a supercritical fluid, and the supercritical mobile phase is supplied to the sample containers as an extraction solvent.

PRIOR ART DOCUMENT

Patent Document

Patent Document 1: Japanese Patent Laid-open Publication No. 2014-160055

SUMMARY OF THE INVENTION

Problems to be Solved by the Invention

In the above-described component extraction apparatus, the mobile phase serving as an extraction solvent needs to flow through the sample containers in a supercritical state. To maintain the supercritical state of the mobile phase flowing through the sample containers, it is necessary to accurately grasp the temperature of the sample containers and control the output of a heater constituting the temperature controller based on the grasped temperature.

In view of this, an object of the present invention is to enable accurate detection of the temperature of the sample container.

Solutions to the Problems

A component extraction apparatus according to the present invention includes: a rack placement part on which a container rack holding a plurality of sample containers is mounted; a heater provided in the rack placement part so as to be in contact with the sample containers held by the container rack directly or indirectly to heat the sample containers when the container rack is mounted on the rack placement part; an extraction medium supply part configured to be connected with the sample containers held by the container rack when the container rack is mounted on the rack placement part and to supply an extraction medium from a bottom side of the sample containers; a needle assembly holding a needle so that a tip of the needle points downward and is configured to move the needle in a vertical direction and in a horizontal-plane direction, the needle is for connecting a flow channel to the sample containers by inserting the tip thereof into a needle port provided on an upper surface of each of the sample containers; and a temperature sensor provided in the needle assembly so as to detect a temperature of the upper surface of the sample container when the tip of the needle is inserted into the needle port of the sample container. That is, in the present invention, the sample containers are heated from the bottom side by the heater, and the temperature of the sample containers is measured in the upper surface side of the sample containers that is farthest from the heater.

The temperature sensor may be configured to move vertically together with the needle, and has a lower surface that comes into contact with the upper surface of the sample container when the tip of the needle is inserted into the needle port of the sample container.

It is preferable that the needle assembly includes a sensor holding part that holds the temperature sensor so that the lower surface of the temperature sensor is positioned substantially horizontally, and the sensor holding part has a floating structure, the floating structure is configured to tilt the temperature sensor elastically according to inclination of the upper surface of the sample container so that the lower surface and the upper surface come in close contact with each other when the lower surface of the temperature sensor comes in contact with the upper surface of the sample container. Since the sensor holding part has a floating structure that allows the temperature sensor to tilt according to the inclination of the upper surface of the sample container, the lower surface of the temperature sensor can be in close contact with the upper surface of the sample containers with high reliability, which increases the accuracy in detecting the temperature of the sample containers.

As one example of a more preferable embodiment, the sensor holding part may be a cylindrical member that surrounds a tip portion of the needle, the sensor holding part including: a hollow portion that accommodates the temperature sensor closer to a lower end thereof; an opening that leads the lower surface of the temperature sensor accommodated in the hollow portion to protrude downward from a lower end surface of the sensor holding part; and an elastic support member that is interposed between a back wall surface of the hollow portion and an upper surface of the temperature sensor, and supports the temperature sensor in a swingable manner. Here, the term "swingable" means that the temperature sensor can be tilted within a certain angular range (for example, within an angular range of 15° or less) by an external force. The elastic support member supports the temperature sensor, thereby achieving the floating structure of the sensor holding part in a swingable manner.

In the above configuration, the temperature sensor may include a detection element and a heat transfer member, the detection element has an annular shape, the heat transfer member, which has a cylindrical shape and thermal conductivity, is disposed below the detection element while an upper surface thereof is in contact with the detection member, and a lower surface of the heat transfer member is protruding from the opening of the sensor holding part. In that case, the hollow portion of the sensor holding part has an inner diameter larger than an inner diameter of the opening, and the opening has a thread on an inner peripheral surface thereof. The detection element has an outer diameter smaller than the inner diameter of the opening of the sensor holding part. Further, the heat transfer member has an upper part and a lower part, an outer diameter of the upper part is substantially identical to the inner diameter of the opening, the upper part has a thread on an outer peripheral surface thereof to be screwed to the thread on the inner peripheral surface of the opening, and the lower part has an outer diameter smaller than the outer diameter of the upper part. In this configuration, the elastic support member, the detection element, and the heat transfer member can be placed in the hollow portion through the opening of the lower surface of the sensor holding part.

Specifically, the elastic support member and the detection element are inserted into the hollow portion of the sensor holding part through the opening of the lower surface, and then the upper part of the heat transfer member is inserted into the hollow portion by turning the heat transfer member in such a way that the thread on the heat transfer member is screwed to the thread on the inner peripheral surface of the opening. After being released from the screw-engagement with the inner peripheral surface of the opening, the upper part of the heat transfer member is slidably accommodated in the hollow portion having an inner diameter larger than the outer diameter of the heat transfer member. The heat transfer member is prevented from falling through the opening of the sensor holding part as a step that is caused by a difference in outer diameter between the upper part and the lower part is caught at the opening of the sensor holding part.

An example of the elastic support member is a wave washer.

It is preferable that the needle assembly further includes a holding block holding the needle and an elastic member, an upper end of the elastic member is moved vertically together with the holding block, and the elastic member is in contact with the sensor holding part with a lower end thereof and is configured to press the sensor holding part downward with an elastic force thereof, and wherein the sensor holding part is configured to able to move in a vertical direction relative to the needle by expanding and contracting of the elastic member, and to press the lower surface of the temperature sensor against the upper surface of the sample container with the elastic force of the elastic member when the tip of the needle is inserted into the needle port of the sample container. In this configuration, the lower surface of the temperature sensor comes into contact more strongly with the upper surface of the sample container when the tip of the needle is inserted into the needle port of each sample container, which increases the accuracy in detecting the temperature of the sample containers.

In the above configuration, it is preferable that the needle assembly further includes a contact sensor configured to detect that the sensor holding part has moved a certain distance relative to the needle toward a base end of the needle. In this configuration, the presence or absence of the sample containers can be determined by lowering the needle.

It is preferable that the component extraction apparatus further includes a temperature controller configured to control an output of the heater based on a detection signal from the temperature sensor so that a temperature of the sample containers is adjusted to a preset temperature. In this configuration, the temperature of the sample containers can be controlled precisely.

Effects of the Invention

In a component extraction apparatus according to the present invention, sample containers are heated from the bottom side by a heater, and the temperature of the sample containers is detected on the upper surface side of the sample container that is farthest from the heater, whereby the heating condition of the entire sample container can be accurately detected with the temperature sensor.

EMBODIMENT OF THE INVENTION

Figure 1:
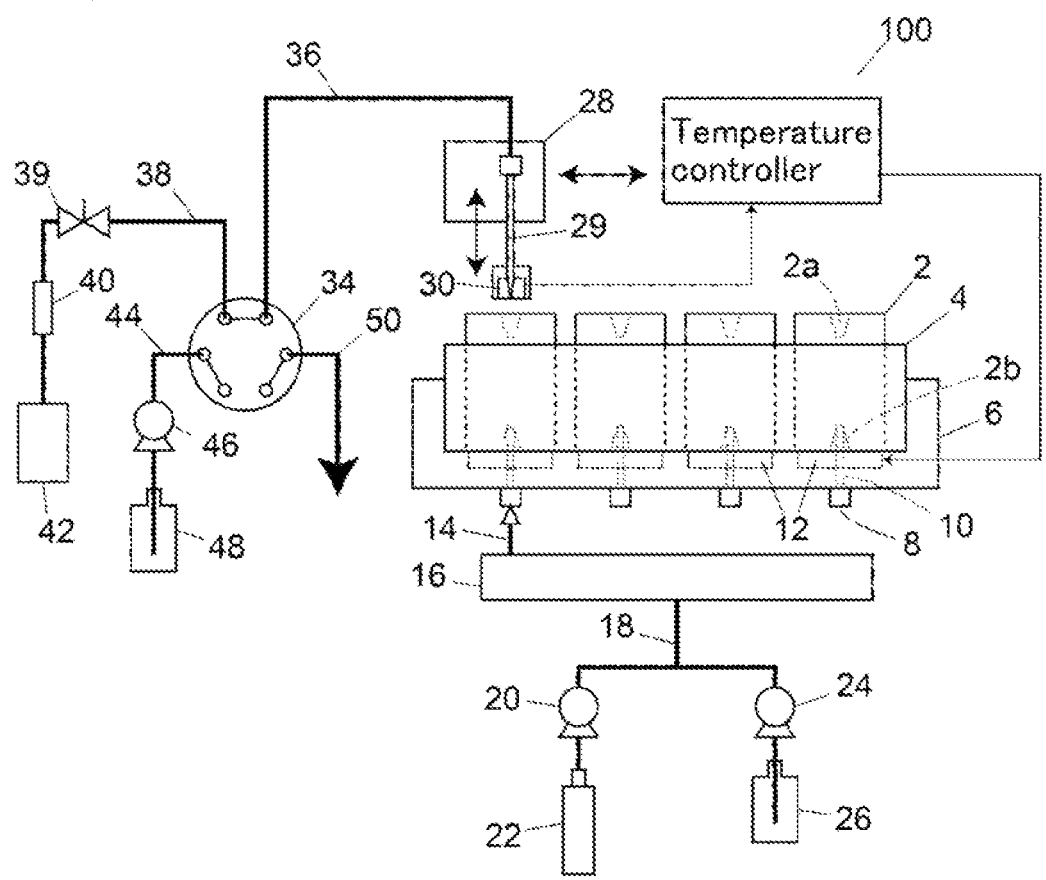
FIG. 1 is a diagram schematically showing an overall configuration of one embodiment of a component extraction apparatus.

Hereinafter, an embodiment of a component extraction apparatus will be described with reference to the drawings.

First, the overall configuration of the component extraction apparatus of the present embodiment will be described with reference to FIG. 1.

The component extraction apparatus of the present embodiment includes a placement stand 6 (rack placement part) on which a container rack 4 holding sample containers 4, and is configured to connect flow channels to the sample containers 2 held by the container rack 4 placed on the placement stand 6 by using needles 14, 29, extract a component by supplying a supercritical fluid serving as an extraction medium to the sample containers 2, and collect the extracted component into a preparative container 42.

The sample containers 2 storing a sample are held by the container rack 4, and placed on the placement stand 6. The container rack 4 includes a plurality of recesses for accommodating the sample containers 2, and the sample containers 2 are individually fitted into the respective recesses. The upper surface and the lower surface of each sample container 2 respectively includes needle ports 2a, 2b into which the needles are inserted to connect flow channels. The bottom surface of each recess of the container rack 4 is opened so as to expose the needle port 2b on the lower surface of the individual sample container 2 fitted in the recess.

The placement stand 6 includes a plurality of needles 10 arranged with their tips pointing upward. The needles 10 are disposed in such a way that the tips thereof are inserted into the respective needle ports 2b of the sample containers 2 held by the container rack 4 when the container rack 4 is placed at a predetermined position on the placement stand 6. The lower surface of the placement stand 6 includes a plurality of needle ports 8 that are downwardly opened. The needle ports 8 are disposed corresponding to the needles 10, and communicate with the base ends of the corresponding needles 10. By inserting the tips of needles 10 into the needle ports 2b of the sample containers 2, the internal spaces of the sample containers 2 and the needle ports 8 are connected respectively through the inner channels of the needles 10.

Figure 7:
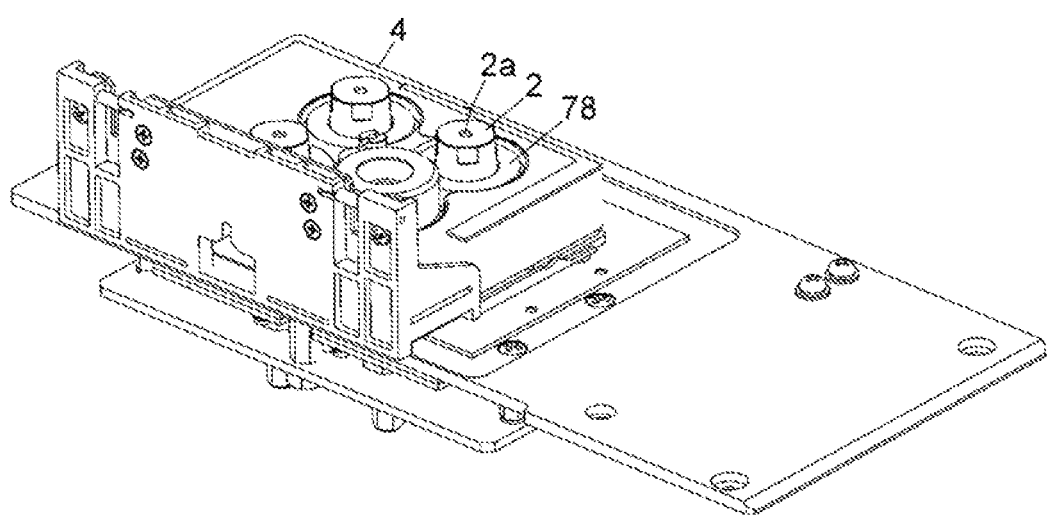
FIG. 7 is a perspective view showing a state of sample containers without caps.

The placement stand 6 includes heating blocks 12 at a position corresponding to the lower portions of the sample containers 2 held by the container rack 4 placed on the predetermined position. The individual heating block 12 is obtained by attaching a heater (not shown) to a ring-shaped heat conductive member that covers the outer peripheral surface of each needle 10. The heating blocks 12 are configured to contact cylindrical members 78 having thermal conductivity included in the container rack 4 (see FIG. 7) and heat the sample containers 2 through the cylindrical members 78, while heating the extraction medium flowing through the needles 10 to a predetermined temperature. The heat transfer blocks 78 will be described later.

The output of the heater included in each heating block is controlled by a temperature controller 100. The temperature controller 100 is configured to read a detection signal from a temperature sensor 30, and control the output of the heater included in each heating block 12 such that the individual sample container 2 has a preset temperature based on a value of the read signal. The temperature controller 100 may be achieved by a computer included in the component extraction apparatus, or may be achieved by a general-purpose personal computer or a dedicated computer connected to the component extraction apparatus.

A needle movement mechanism 16 is disposed below the placement stand 6. The needle movement mechanism 16 is configured to move the needle 14, whose tip points upward, in a horizontal-plane direction and in a vertical direction to insert the tip of the needle 14 into a freely-selected needle port 8 of the placement stand 6. The needle 14 is connected with a pipe 18 configured to feed a mixed fluid of carbon dioxide supplied by a pump 20 from a carbon dioxide cylinder 22 and a modifier supplied by a pump 24 from a modifier container 26. The pipe 18, the pump 20, the carbon dioxide cylinder 22, the pump 24, and the modifier container 26 constitute an extraction medium supply part.

A needle assembly 28 is disposed above the placement stand 6. The needle assembly 28 is configured to move the needle 29, whose tip points downward, in a horizontal-plane direction and in a vertical direction to insert the tip of the needle 29 into the needle port 2a of a freely-selected sample container 2 from among the sample containers 2. The needle 29 includes the temperature sensor 30 at a tip portion thereof. When the tip of the needle 29 is inserted into the needle port 2a of the sample container 2, the temperature sensor 30 is configured to detect the temperature of the one of the sample containers 2 by contacting the upper surface thereof. The structure of the portion where the temperature sensor 30 is disposed will be described later.

The base end of the needle 29 is connected to one port of a switching valve 34 via a pipe 36. The switching valve 34 has six ports and is configured to switch connections between adjacent ones of the ports. Of the two ports adjacent to the port connected with the pipe 36, one is connected with an extraction channel 38, and the other is connected with a drain channel 50. The port connected with the extraction channel 38 is adjacent to the port connected with an elution solvent supply channel 44. The port connected with the elution liquid supply channel 44 and the port connected with the drain channel 50 are adjacent to closed ports, respectively. The closed ports refer to a port to which no flow channel is connected.

The extraction channel 38 is connected to the preparative container 42 via the back pressure regulating valve 39 and a trap column 40. The elution solvent supply channel 44 is a flow channel configured to feed an elution solvent from a solvent container 48 by a pump 46.

In the component extraction apparatus of the present embodiment, the pipes 18 and 36 are connected to any one of the sample containers 2 held by the container rack 4 placed at the predetermined position on the placement stand 6 via the corresponding needles 14 and 29, and the one sample container 2 is supplied with the mixed fluid of carbon dioxide and modifier. At this time, the pipe 36 is in a state connected to the extraction channel 38 by the switching valve 34 (the state shown in FIG. 1).

The set pressure of the back pressure regulating valve is a pressure at which carbon dioxide serving as an extraction solvent becomes a supercritical state (for example, 7 MPa or more). Further, the temperature controller 100 controls the output of the heater attached to each heating block 12 in such a way that the temperature of one of the sample containers 2 detected by the temperature sensor 30 maintains a temperature for bringing carbon dioxide into a supercritical state (for example, 31° C. or more).

In this configuration, the supercritical fluid flows into one of the sample containers 2, so that a component is extracted from the sample stored therein. The sample component extracted from the sample containers 2 is guided to the extraction channel 38 together with the supercritical fluid, and flows into the trap column 40 through the back pressure regulating valve 39. Since the pressure in the flow channel on the downstream of the back pressure regulating valve 39 is low, the carbon dioxide changes from the supercritical state to a gaseous state and loses its dissolving power. Thereby, the sample component extracted from the sample containers 2 is captured by the trap column 40.

Then, the switching valve 34 is switched, and the extraction channel 38 is connected with the elution solvent supply channel 44. In this state, the elution solvent is fed from the solvent container 48 by the pump 46 and flows through the trap column 40, whereby the sample component, which has been captured by the trap column 40, is eluted from the trap column 40 and guided to and collected in the preparative container 42.

An example of a specific configuration of the needle assembly 28 will be described with reference to FIGS. 2 to 8.

Figure 2:
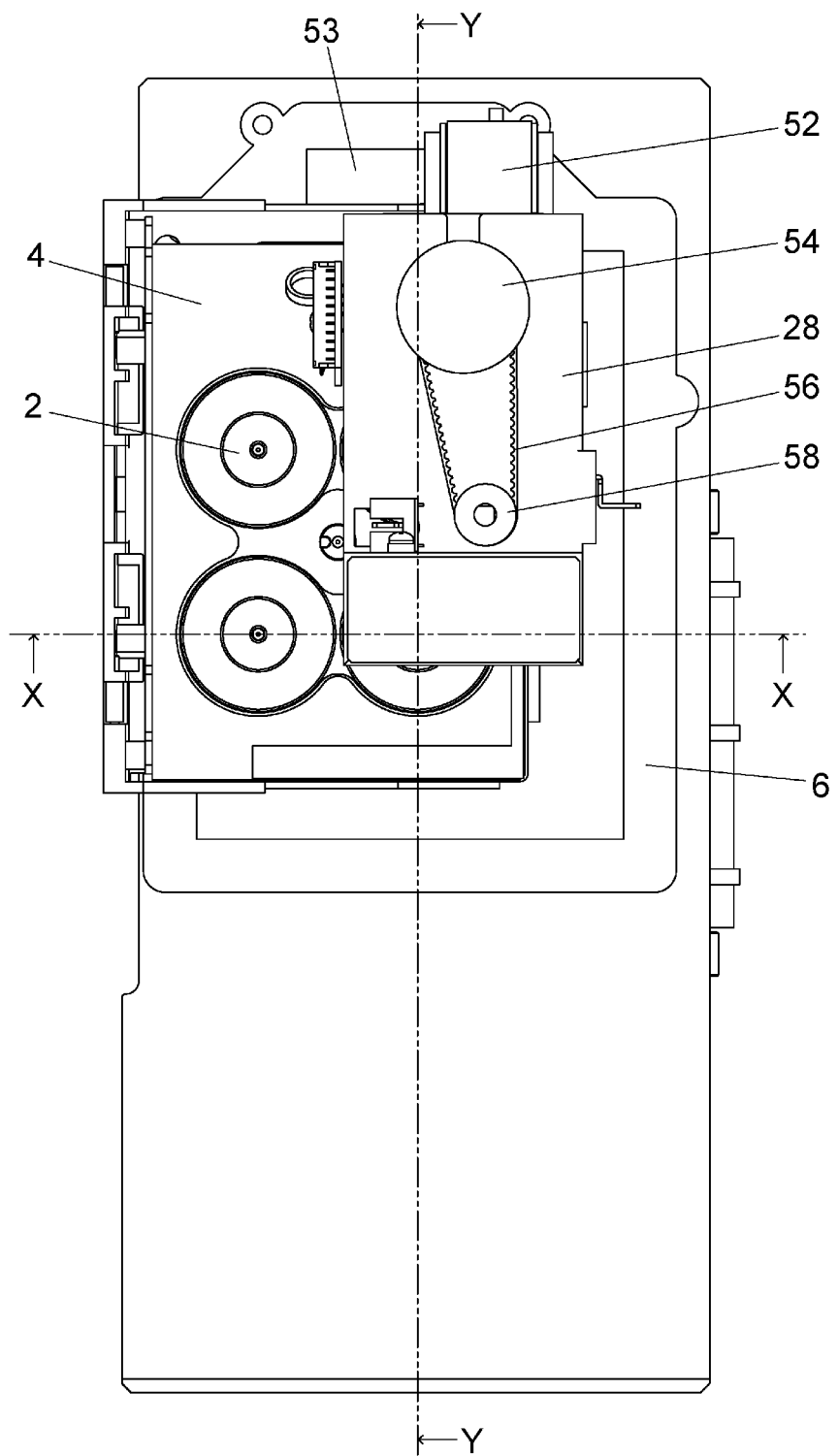
FIG. 2 is a plan view of the component extraction apparatus of the embodiment.

As shown in FIG. 2, the needle assembly 28 is attached to a slide rail 52. The slide rail 52 is disposed to extend in one horizontal-plane direction (top-down direction in the figure), and the needle assembly 28 moves along the slide rail 52. The base end of the slide rail 52 is attached to a guide rail 53 disposed to extend in one horizontal-plane direction (left and right direction in the figure) above the placement stand 6, and moves along the guide rail 53. This configuration allows the needle assembly 28 to move in two directions orthogonal to each other in a horizontal plane (the left and right direction and the top-down direction in the figure) above the placement stand 6, thereby enabling the needle 29 to be positioned above any one of the sample containers 2.

Figure 3:
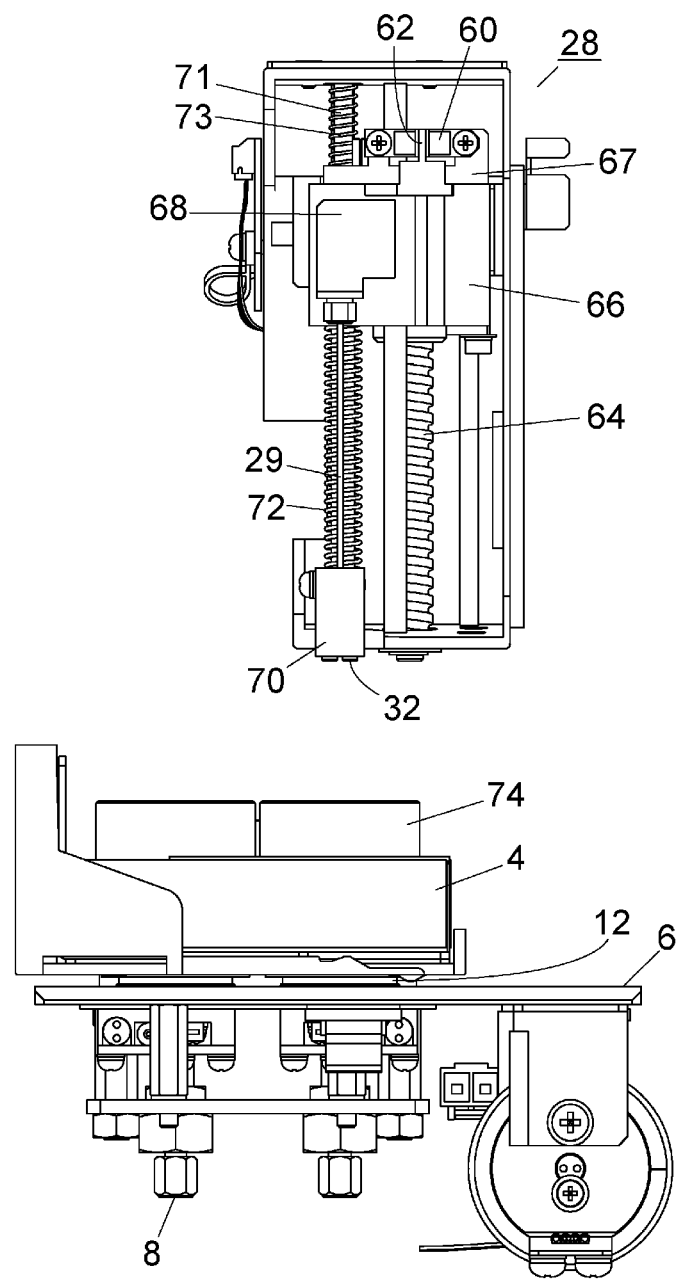
FIG. 3 is a sectional view taken along line X-X in FIG. 2.
Figure 4:
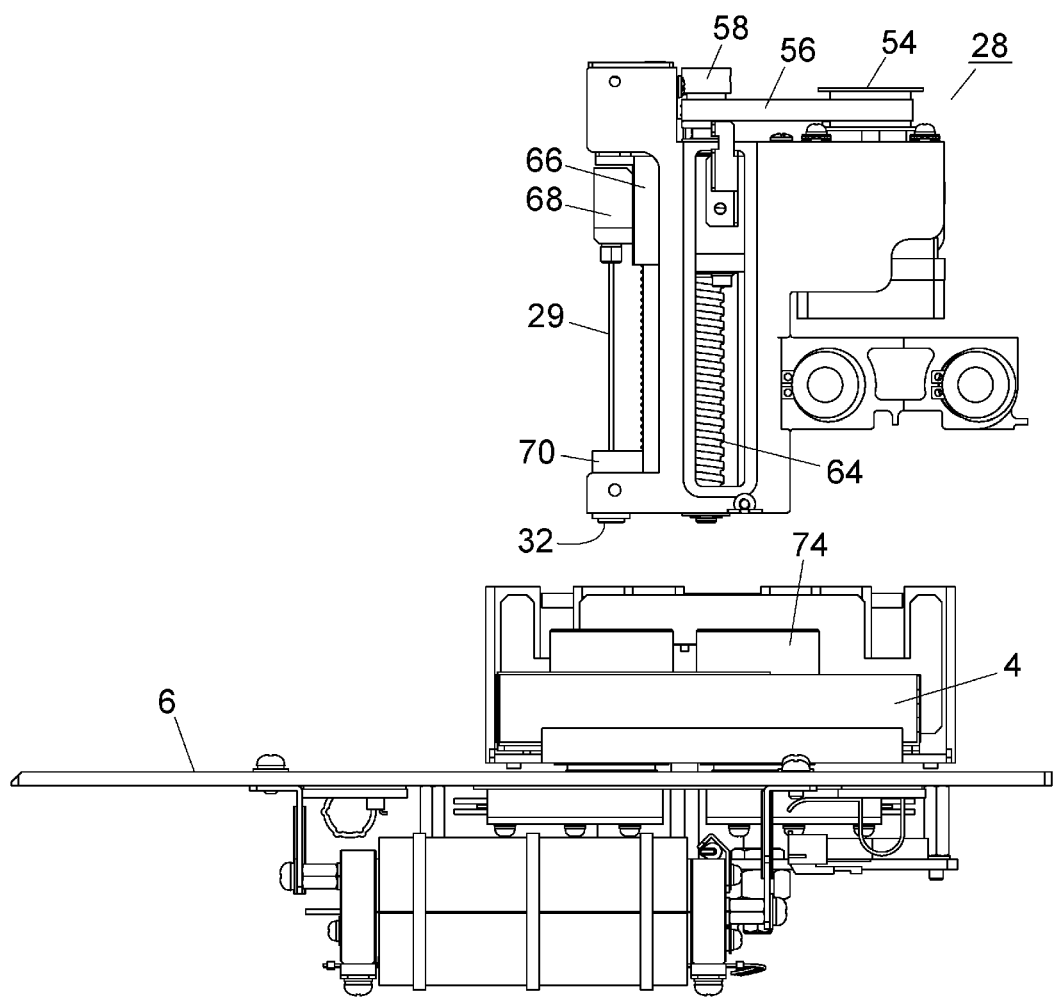
FIG. 4 is a sectional view taken along line Y-Y in FIG. 2.

Pulleys 54, 58 and a belt 56 loop around the pulleys 54, 58 are provided on the upper surface of the needle assembly 28. The pulley 54 is rotated by a stepping motor (not shown), and the rotation of the pulley 54 causes the pulley 58 to rotate. As shown in FIGS. 3 and 4, the pulley 58 is attached to the upper end of a screw shaft 64 disposed in the vertical direction, and the rotation of the pulley 58 turns the screw shaft 64.

The screw shaft 64 is equipped with a moving block 66 configured to move vertically according to the turn of the screw shaft 64. The moving block 66 is equipped with a holding block 68. The holding block 68 holds the base end of the needle 29. The needle 29 extends vertically downward from the holding block 68.

An upper block 67 is provided above the moving block 66. The upper block 67 is equipped with a microsensor 60 having a slit cut in the vertical direction. The upper portion of the moving block 66 is equipped with a sector 62 to be inserted into the slit of the microsensor 60 when the upper block 67 is positioned immediately above the moving block 66.

A sensor block 70 (sensor holding part) is provided at a position corresponding to the tip portion of the needle 29. The sensor block 70 is a cylindrical member that surrounds the outer peripheral surface of the tip portion of the needle 29, and accommodates the temperature sensor 30 (see FIGS. 1 and 8). The interior structure of the sensor block 70 will be described later.

Figure 5:
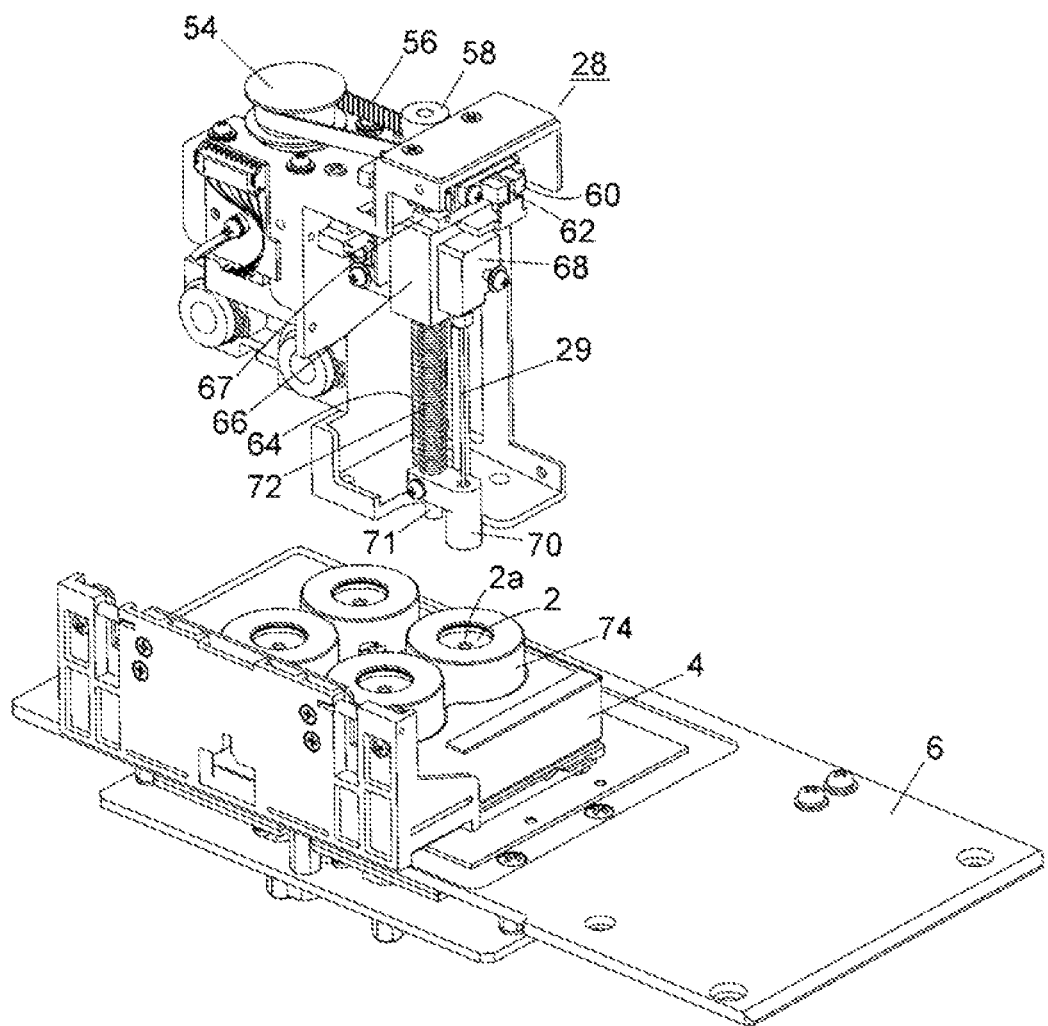
FIG. 5 is a perspective view showing a state before inserting a needle into a needle port of one of sample containers in the component extraction apparatus of the embodiment.
Figure 6:
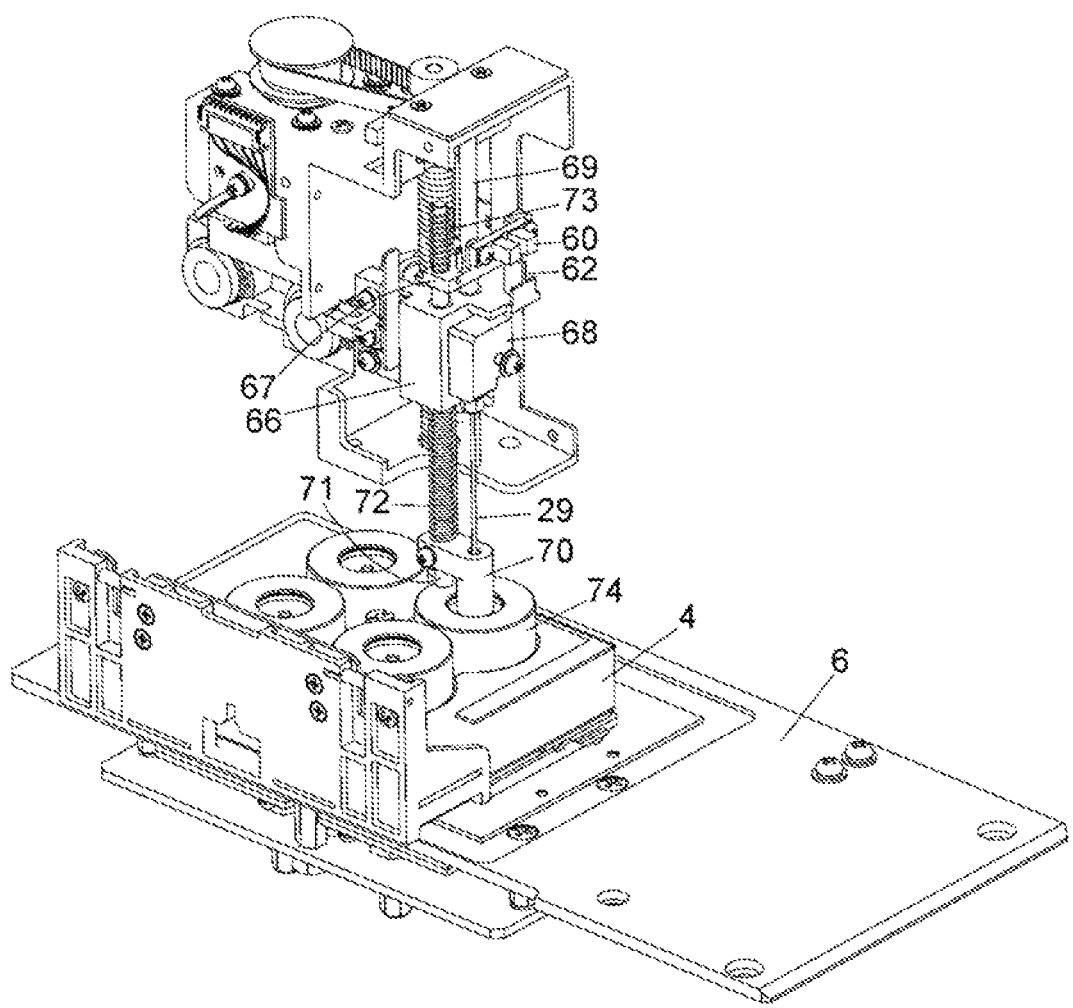
FIG. 6 is a perspective view showing a state where the needle is inserted into the needle port of the one of the sample containers in the component extraction apparatus of the embodiment.

As shown in FIGS. 5 and 6, the sensor block 70 is attached to the lower end of a shaft 71 disposed near the needle 29 so as to extend in the vertical direction. The shaft 71 penetrates the moving block 66 and the upper block 67, but is not fixed to either of the moving block 66 or the upper block 67.

A coil spring 72 (an elastic member) that stretches and compresses in a vertical direction is provided between a portion of the sensor block 70 fixed to the shaft 71 and the moving block 66. The coil spring 72 is disposed to cover the outer peripheral surface of the shaft 72. In addition to the coil spring 72, a coil spring 73 is provided at the upper end of the shaft 71 so as to stretch and compress in a vertical direction. The upper end of the coil spring 73 is fixed to the upper end of the shaft 71, and the other end thereof is fixed to the upper block 67.

Figure 8:
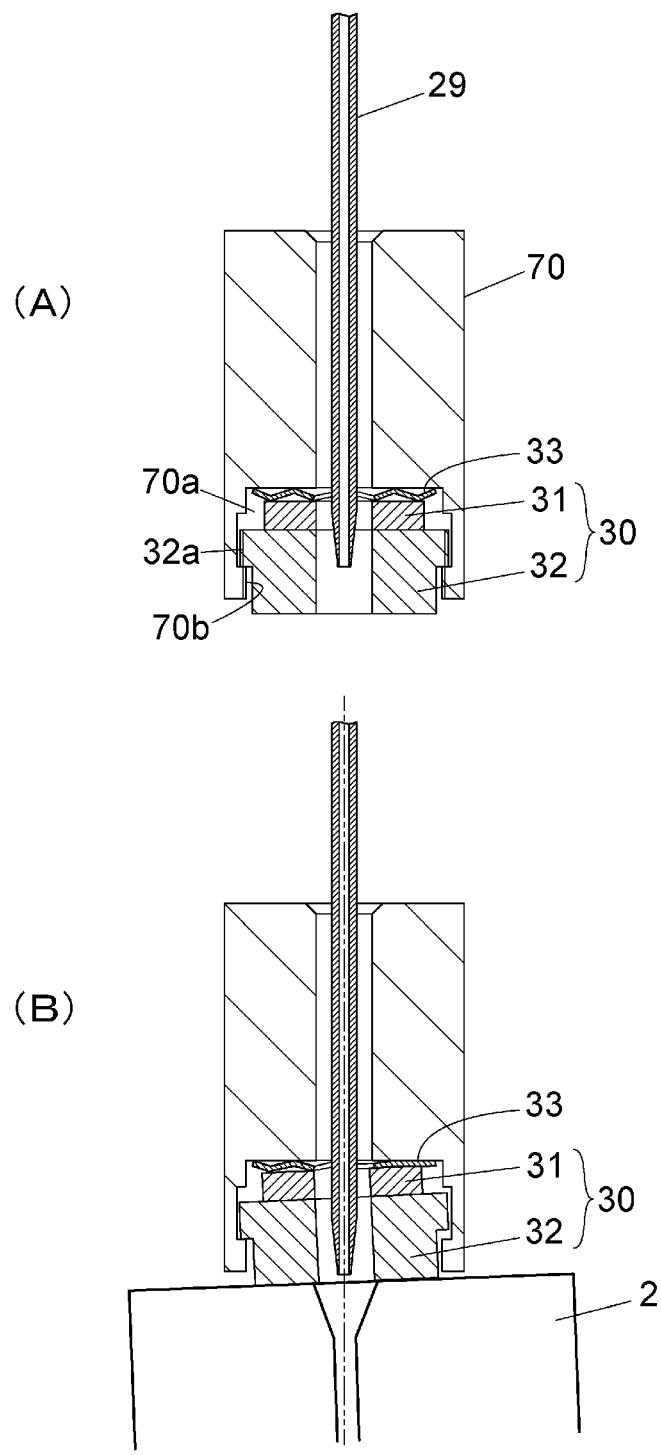
FIG. 8 is a view for explaining the movement of a temperature sensor when a needle tip is inserted into the needle port: part (A) of FIG. 8 shows a state where the lower surface of the temperature sensor is not in contact with the upper surface of the sample container, and part (B) of FIG. 8 shows a state where the lower surface of the temperature sensor is in contact with the upper surface of the sample container.

In this configuration, when the lower end surface of the sensor block 70 (to be precise, the lower end surface of a heat transfer member 32, see FIG. 8) is not in contact with the upper surface of any of the sample containers 2 as shown in FIG. 5, the elastic force of the coil spring 72 causes a vertical movement of the sensor block 70 and also causes a vertical movement of the shaft 71 according to the vertical movement of the moving block 66. According to the vertical movement of the shaft 71, the elastic force of the coil spring 73 also causes a vertical movement of the upper block 67. Therefore, in a state where the sensor block 70 is not in contact with the upper surfaces of the sample containers 2, there is no change in the positional relationships between the needle 29 and the sensor block 70 and between the moving block 66 and the upper block 67.

Whereas, when the moving block 66 is lowered further from the state in which the lower end surface of the sensor block 70 is in contact with the upper surface of one of the sample containers 2 as shown in FIG. 6, the positional relationship between the moving block 66 and the sensor block 70 changes to compress the coil spring 72, whereby the sensor block 70 is pressed downward. As a result, the lower surface of the heat transfer block 32 is pressed downward from the lower end surface of the sensor block 70 against the upper surface of one of the sample containers 2, which allows the temperature sensor 30 to have good contact with the sample container 2 (see FIG. 8).

Furthermore, the change in the positional relationship between the moving block 66 and the sensor block 70 changes the positional relationship between the shaft 71 and the upper block 67 to change the length of the shaft 71 protruding from the upper block 67. When the length of the shaft 71 protruding from the upper block 67 changes, the coil spring 73 stretches and generates an elastic force to pull the upper block 67 toward the upper end side of the shaft 71, and the upper block 67 is moved away from the moving block 67. When the upper block 67 is moved away from the moving block 67, the sector 62 is pulled out from the slit of the microsensor 60, and the microsensor 60 changes from the ON state to the OFF state. Whether or not the sensor block 70 is in contact with one of the sample containers 2 is determined by detecting the change in the state of the microsensor 60. That is, the microsensors 60 and 62 are contact sensors configured to determine the presence or absence of the sample containers 2 by sensing a relative movement between the needle 29 and the sensor block 70.

Here, the sample containers 2 are covered with individual caps 74 each having an opening on the upper surface thereof so that the sensor block 70 is passed through the opening, and the tip of the needle 29 is inserted into the needle port 2a of one of the sample containers 2. The container rack 4 has a plurality of accommodating parts for accommodating the sample containers 2, and the accommodating parts include the individual cylindrical members 78 with thermal conductivity. The sample containers 2 are accommodated inside the cylindrical members 78 respectively, and receive heat from the heating blocks 12 through the cylindrical member 78.

As described above, the lower surface of each sample container 2 includes the needle port 2b into which the tip of the needle 10 is inserted to support the sample container (see FIG. 1). Although the outer peripheral surface of each sample container 2 is supported by corresponding one of the cylindrical members 78, there is a slight gap between each sample container 2 and the corresponding cylindrical member 78. With this structure, the upper surfaces of the sample containers 2 are not always positioned horizontally. If the upper surfaces of the sample containers 2 are not positioned horizontally, the temperature sensor cannot have good contact with a target one of the sample containers 2 when lowered from above to contact the upper surface thereof, which may prevent accurate detection of the temperature of the one of the sample containers 2.

The sensor block 70 of the present embodiment has a floating structure that enables the temperature sensor 30 to have close contact with the upper surfaces of the sample containers 2 even if the upper surfaces of the sample containers 2 are not positioned horizontally. The interior structure of the sensor block 70 will be described with reference to FIG. 8.

The sensor block 70 includes a hollow portion 70a having an opening 70b on the lower end surface of the sensor block 70, and the hollow portion 70a accommodates a detection element 31, the heat transfer block 32, and a wave washer 33. The detection element 31 and the heat transfer block 32 form the temperature sensor 30. The detection element 31 is formed of, for example, a thermocouple sandwiched between two ring-shaped metal washers. The heat transfer block 32 is formed of a metal having good thermal conductivity, such as copper, and is disposed below the detection element 31. The wave washer 33 is interposed between the back wall surface of the hollow portion 70a and the detection element 31.

The outer diameter of the upper part 32a of the heat transfer block 32 is larger than that of the other part of the heat transfer block 32 below the upper part 32a, and the outer peripheral surface of the upper part 32a has a thread. The inner diameter of the opening 70b of the sensor block 70 is substantially the same as the outer diameter of the upper part 32a of the heat transfer block 32. The inner peripheral surface of the opening 70b has a thread to be screwed to the thread of the outer peripheral surface of the upper part 32a of the heat transfer block 32. The outer diameter of the lower part of the heat transfer block 32 is smaller than the inner diameter of the opening 70b. The inner diameter of the hollow portion 70a of the sensor block 70 is larger than the inner diameter of the opening 70b. The detection element 31 is smaller than the inner diameter of the hollow portion 70a.

In this configuration, after the wave washer 33 and the detection element 31 are placed in this order from the back side of the hollow portion 70a, the heat transfer block 32 is turned so that the thread of the upper part 32a is screwed to the thread of the inner peripheral surface of the opening 70b, whereby the upper part of the heat transfer block 32 is accommodated in the hollow portion 70a. After being released from the screw-engagement with the opening 70b, the upper part 32a of the heat transfer block 32 is engaged with the inner edge of the opening 70a of the sensor block 70, thereby preventing the detection element 31, the heat transfer block 32, and the wave washer 33 from falling through the opening 70b.

The wave washer 33 elastically deforms in the surface direction. Even if the upper surface of the sample container 2 is inclined from the horizontal direction as shown in part (B) of FIG. 8, the wave washer 33 is elastically deformed when the lower surface of the heat transfer block 32 is pressed against the upper surface of one of the sample containers 2, which allows the detection element 31 and the heat transfer block 32 to be tilted, and thus, the lower surface of the heat transfer block 32 closely contacts the upper surface of the one of the sample containers 2. That is, the wave washer 33 constitutes an elastic support member that supports the detection element 31 and the heat transfer block 32 in a swingable manner, and achieves the above-described floating structure.

As the elastic support member that supports the temperature sensor 30 in a swingable manner, a member utilizing a coil spring or a leaf spring can be used instead of the wave washer 33.

In the present embodiment, the temperature sensor 30 accommodated in the sensor block 70 is supported in a swingable manner so as to be tilted in accordance with the inclination of the sample containers 2. However, for example, the sensor block 70 itself may be supported in a swingable manner without contacting the needle 29 in such a way that the lower surface of the temperature sensor is tilted according to the inclination of the upper surface of the sample containers 2.

In the present embodiment, the temperature of the upper surface of the sample containers 2 is detected by the temperature sensor 30 that is in direct contact with the sample container 2, but a non-contact temperature sensor, such as a radiation thermometer, may be attached to the needle assembly 28 in such a way that the temperature of the upper surface of the sample container 2 is detected by the non-contact temperature sensor when the needle 29 is inserted into the needle port 2a of one of the sample containers 2.

DESCRIPTION OF REFERENCE SIGNS

2: sample container
2a, 2b: needle port
4: container rack
6: placement stand
8: needle port (placement stand)
10, 14, 29: needle
12: heating block
16: movement mechanism
18, 36: pipe
20, 24, 46: pump
30: temperature sensor
31: detection element
32: heat transfer block
33: wave washer (elastic support member)
34: switching valve
38: extraction channel
39: back pressure regulating valve
40: trap column
42: preparative container
44: elution solvent supply channel
60: micro sensor
62: sector
64: screw shaft
66: moving block
67: upper block
68: holding block
70: sensor block
71: shaft
72: coil spring (elastic member)
100: temperature controller

The invention claimed is:

1. A component extraction apparatus comprising:
   a rack placement part on which a container rack holding a plurality of sample containers is mounted;
   a heater provided in the rack placement part so as to be in contact with the sample containers held by the container rack directly or indirectly to heat the sample containers when the container rack is mounted on the rack placement part;
   an extraction medium supply part configured to be connected with the sample containers held by the container rack when the container rack is mounted on the rack placement part and to supply an extraction medium from a bottom side of the sample containers;
   a needle assembly holding a needle so that a tip of the needle points downward and is configured to move the needle in a vertical direction and in a horizontal-plane direction, the needle is for connecting a flow channel to the sample containers by inserting the tip thereof into a needle port provided on an upper surface of each of the sample containers; and a temperature sensor provided in the needle assembly so as to detect a temperature of the upper surface of the sample container when the tip of the needle is inserted into the needle port of the sample container, wherein the temperature sensor is configured to move vertically together with the needle, and has a lower surface that comes into contact with the upper surface of the sample container when the tip of the needle is inserted into the needle port of the sample container, the needle assembly includes a sensor holding part and an elastic member, the sensor holding part holds the temperature sensor so that the lower surface of the temperature sensor is positioned substantially horizontally, the elastic member is arranged to expand and contract in a vertical direction and to press the sensor holding part downward, and the needle assembly is configured to move the sensor holding part in the vertical direction relative to the needle by expanding and contracting of the elastic member, and the sensor holding part has a floating structure, the floating structure is configured to tilt the temperature sensor elastically according to inclination of the upper surface of the sample container so that the lower surface of the temperature sensor and the upper surface of the sample container come in close contact with each other when the lower surface of the temperature sensor comes in contact with the upper surface of the sample container.

2. The component extraction apparatus according to claim claim 1, wherein the sensor holding part is a cylindrical member that surrounds a tip portion of the needle, the sensor holding part including:

a hollow portion that accommodates the temperature sensor closer to a lower end thereof;

an opening that leads the lower surface of the temperature sensor accommodated in the hollow portion to protrude downward from a lower end surface of the sensor holding part; and an elastic support member that is interposed between a back wall surface of the hollow portion and an upper surface of the temperature sensor, and supports the temperature sensor in a swingable manner.

3. The component extraction apparatus according to claim 2, wherein the temperature sensor includes a detection element and a heat transfer member, the detection element has an annular shape, the heat transfer member, which has a cylindrical shape and thermal conductivity, is disposed below the detection element while an upper surface thereof is in contact with the detection member, and a lower surface of the heat transfer member is protruding from the opening of the sensor holding part, wherein the hollow portion of the sensor holding part has an inner diameter larger than an inner diameter of the opening, and the opening has a thread on an inner peripheral surface thereof, wherein the detection element has an outer diameter smaller than the inner diameter of the opening, and wherein the heat transfer member has an upper part and a lower part, an outer diameter of the upper part is substantially identical to the inner diameter of the opening, the upper part has a thread on an outer peripheral surface thereof to be screwed to the thread on the inner peripheral surface of the opening, and the lower part has an outer diameter smaller than the outer diameter of the upper part.

4. The component extraction apparatus according to claim 2, wherein the elastic support member is a wave washer.

5. The component extraction apparatus according to claim 1, wherein the needle assembly further includes a holding block holding the needle, an upper end of the elastic member is moved vertically together with the holding block, a lower end of the elastic member contacts the sensor holding part and the elastic member presses the sensor holding part downward with an elastic force thereof, and wherein the needle assembly is configured to press the lower surface of the temperature sensor against the upper surface of the sample container with the elastic force of the elastic member when the tip of the needle is inserted into the needle port of the sample container.

6. The component extraction apparatus according to claim 5, wherein the needle assembly further includes a contact sensor configured to detect that the sensor holding part has moved a certain distance relative to the needle toward a base end of the needle.

7. The component extraction apparatus according to claim 1, further comprising a temperature controller configured to control an output of the heater based on a detection signal from the temperature sensor so that a temperature of the sample containers is adjusted to a preset temperature.

* * * * *